INVENTOR
George T. Lott

BY
Howard T. Keiser
& Jack J. Earl
ATTORNEYS

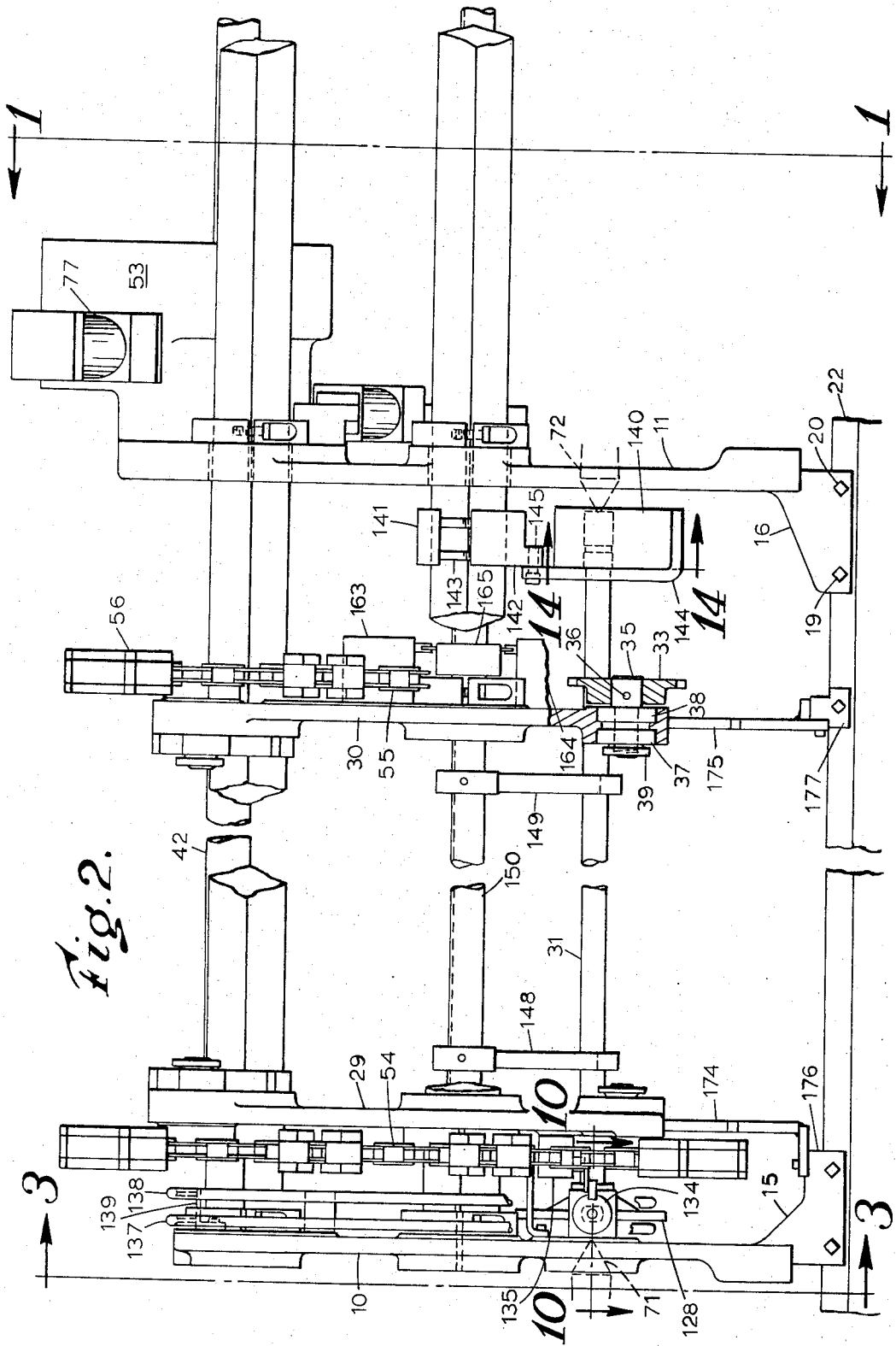

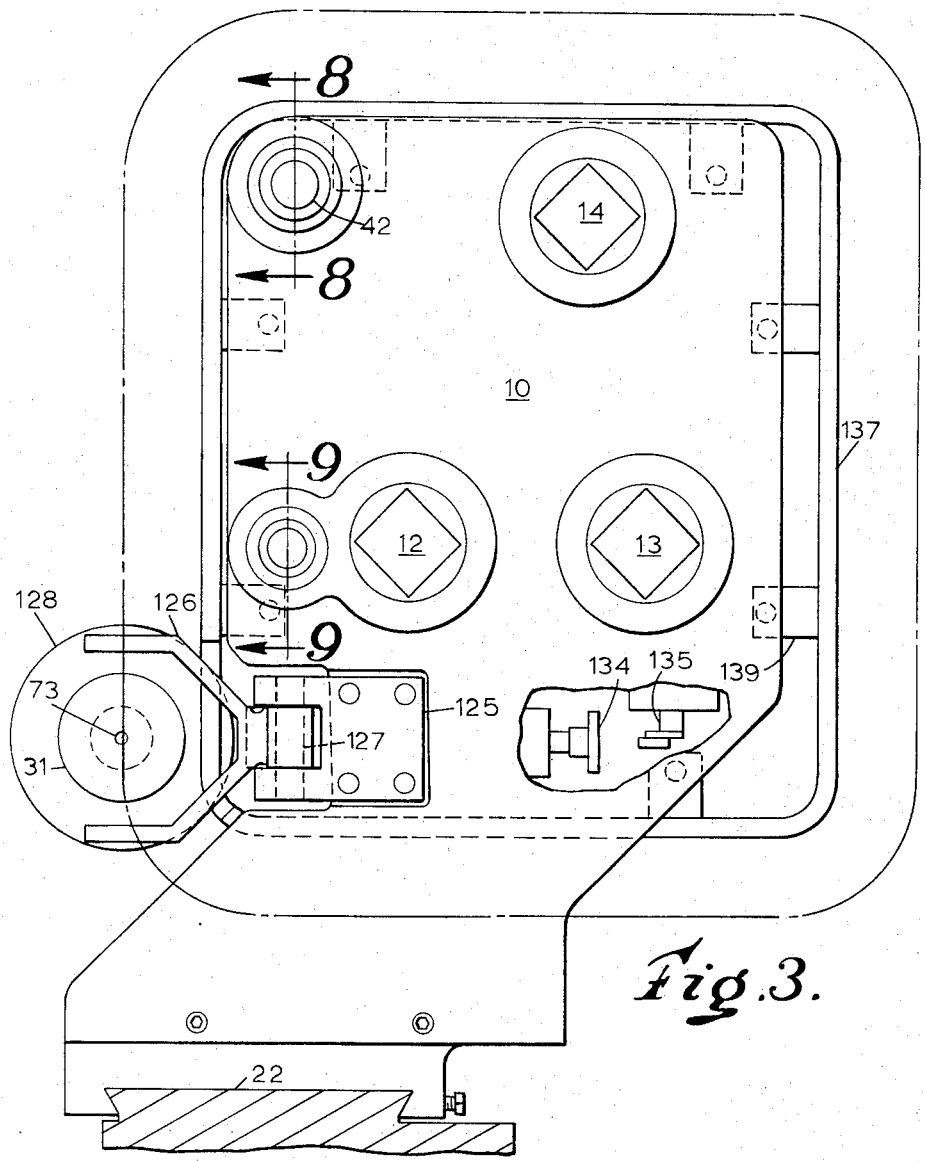
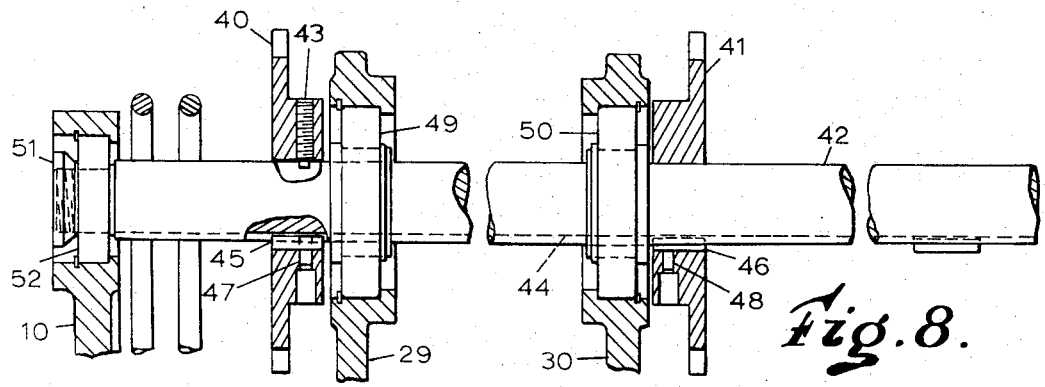

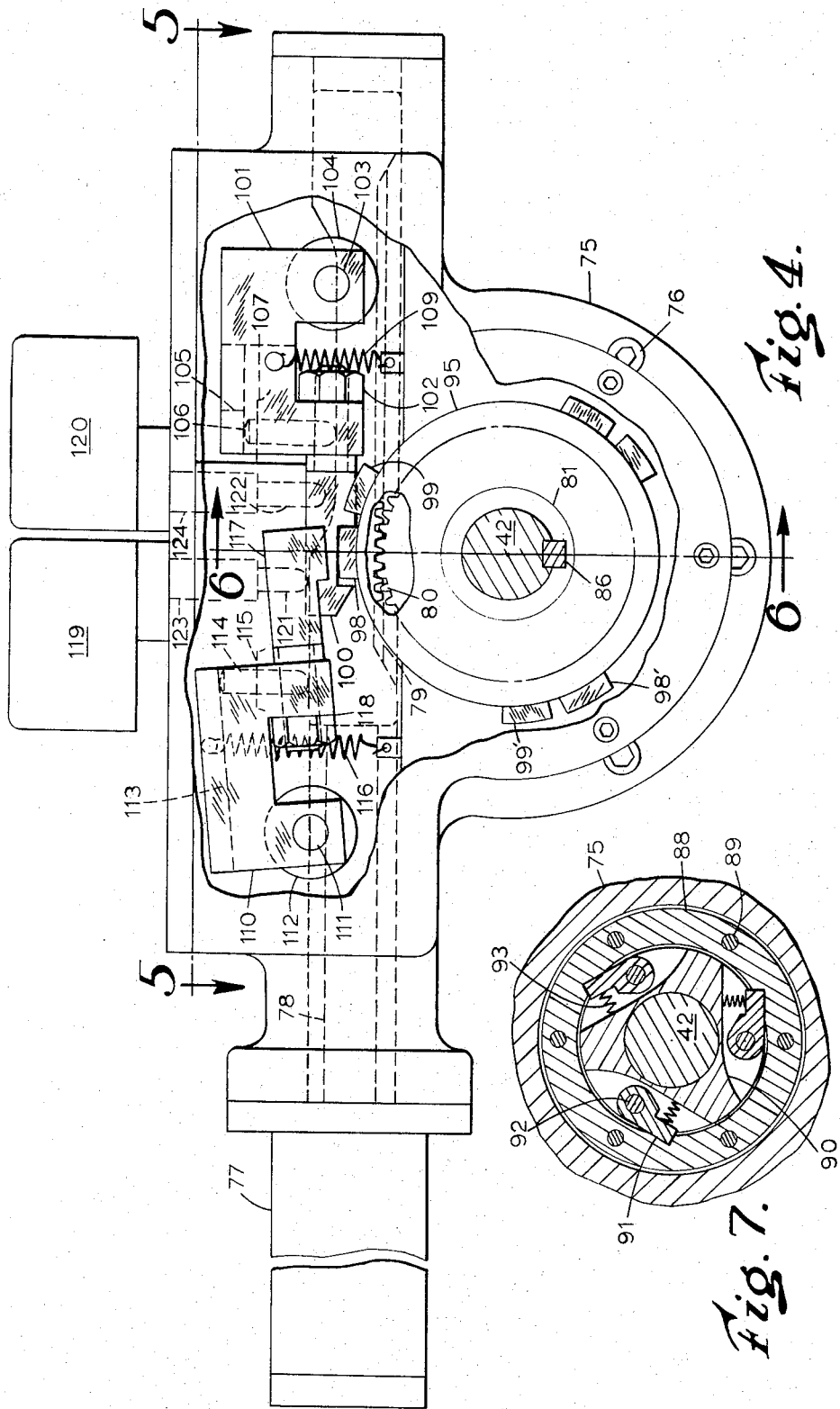

April 9, 1968

G. T. LOTT 3,376,968

LOADING FIXTURE

Filed March 26, 1965

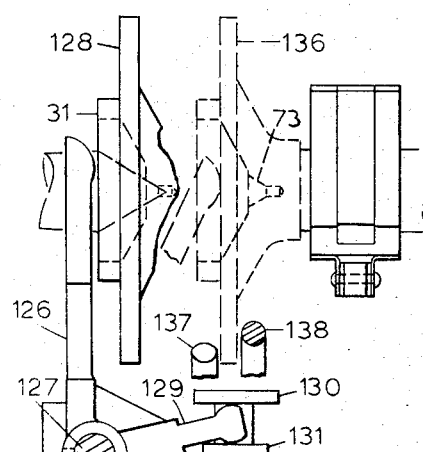
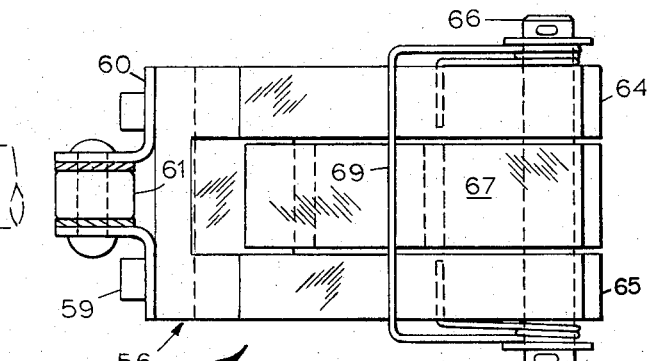
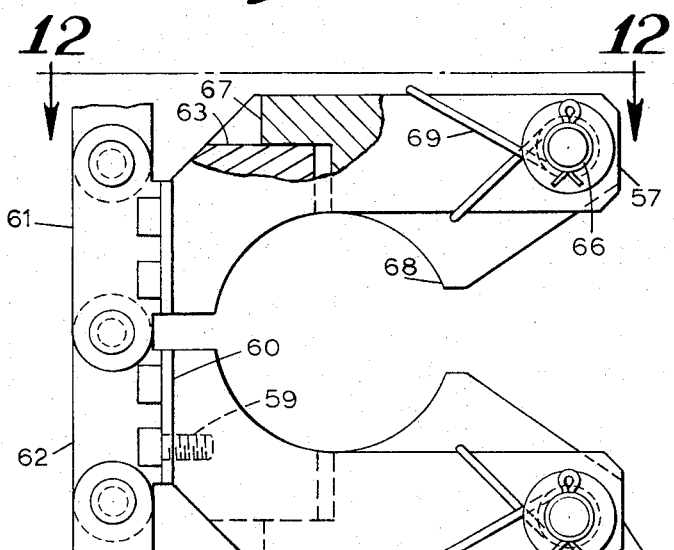
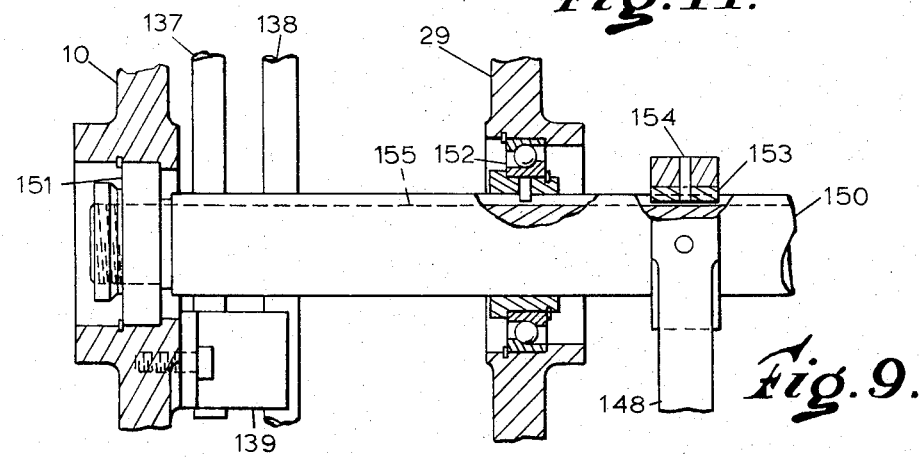

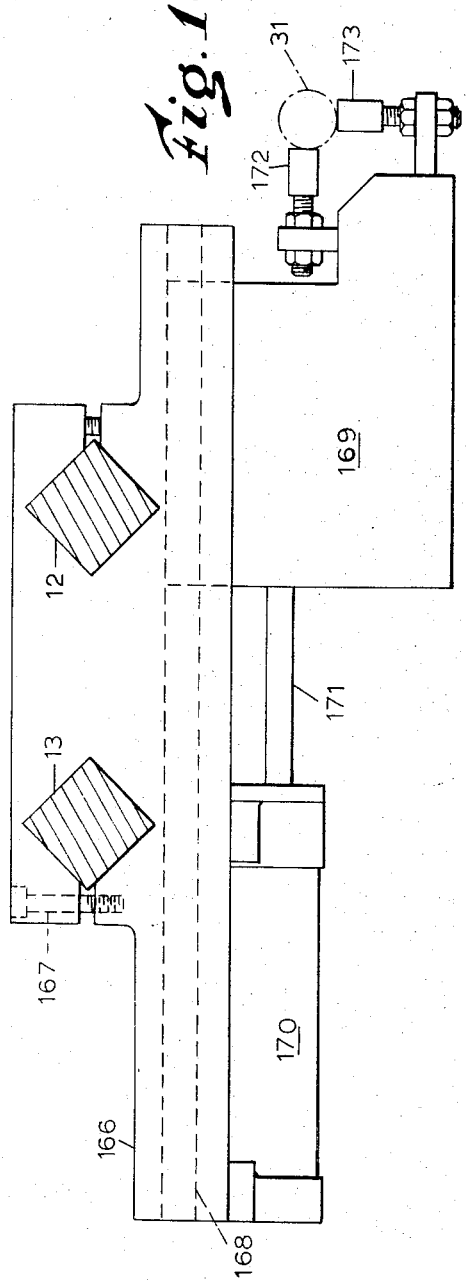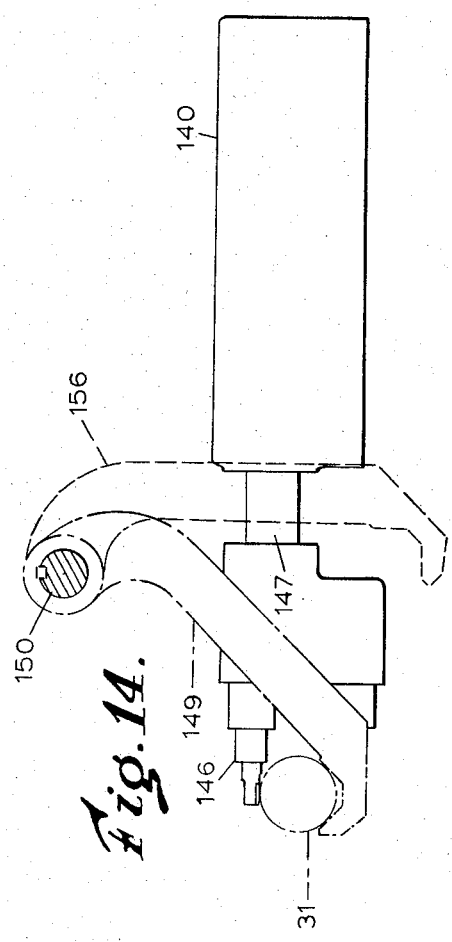

United States Patent Office 3,376,968
Patented Apr. 9, 1968

3,376,968
LOADING FIXTURE
George T. Lott, 7200 Huckleberry Lane,
Cincinnati, Ohio 45242
Filed Mar. 26, 1965, Ser. No. 442,923
2 Claims. (Cl. 198—19)

ABSTRACT OF THE DISCLOSURE

An apparatus is shown which is adapted to move elongated articles from one station to another past a location at which work is performed on the articles. The articles are held at each end by grippers mounted on an endless chain. The chains are driven in a step by step manner and means is included in the driving mechanism to prevent overrunning of the drive mechanism due to the weight of articles carrier by the apparatus. There are also included in the apparatus an in-process gauging unit and a backrest mechanism, both of which are supported between the ends of the articles carried and within the path of the articles as they are moved from the one station to the other.

---

This invention relates to work handling mechanisms for moving workpieces to and from a workstation in a machine. The mechanism of this invention specifically is intended to transport workpieces of greater length than diameter to and from a particular position in a machine such as a center type grinding machine where an operation is performed on the workpiece while the mechanism is idle or at rest.

It is an object of this invention to provide a mechanism for transporting workpieces of elongated shape which is readily convertible to transport workpieces having a different length or shape from those for which it was previously adjusted.

It is also an object of this invention to provide a work handling mechanism in which the gripping and releasing of workpieces is accomplished without requiring drive and control elements separate from the mechanism which powers movement of the workpieces in the mechanism.

A further object of this invention is the provision of a work handling mechanism in which there can be combined an in-process gauge unit that is positioned to measure workpieces carried to a work station and is adapted for adjustment in the mechanism for measuring the workpieces at a selected point along their length.

It is yet another object of this invention to provide a work handling mechanism in which a backrest unit can be included to support a workpiece at a location between its ends during the performance of an operation on the workpiece.

A still further object is to provide a work handling mechanism which grips and releases workpieces automatically as a function of its incremental movement to shift workpieces to and from a workstation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The mechanism of this invention employs a pair of chains formed into two endless loops and supported for movement around parallel and identical closed paths. Each of the chains has a plurality of work grippers attached to it in equispaced locations. Each gripper is formed of two jaws and each of the two jaws is connected to a link in the respective chain but not the same link. Therefore when the links to which the two jaws of a gripper are attached are in a straight line, the two jaws are in a parallel relationship to close together and grip an end of a workpiece. When the chain is extended around an arcuate curve as when engaged around a portion of a supporting sprocket, the jaws are not parallel but rather are angularly divergent to open and release a workpiece or to permit a workpiece to be inserted. The chains are supported on sprockets mounted on sprocket plates that are adjustable along supporting members. The supporting members are elongated and extend through the plates and in turn are held in position by end support members that are connected to the machine to which the work handling fixture is applied. The support members are releasably attached to the machine for selected positioning thereon and since the sprocket plates are adjustable along the supporting members, or more correctly connecting members since they hold the mechanism together, the entire fixture can be adjusted to handle different lengths of work and can be selectively positioned to present this work at a desired location along the machine. The connecting members also support a gauge unit between the sprocket plates and inside the area of the chain loops to provide an in-process gauging of workpieces. A backrest unit is similarly supportable by the connecting members to provide extra stiffness for workpieces that are relatively thin with respect to their length and are therefore not in themselves rigid enough to allow desired accuracies to be maintained in a finishing operation such as cylindrical grinding.

A clear understanding of the present invention can be obtained from the following detailed description in which reference is made to the attached drawings wherein:

FIG. 2 is a front view in elevation of the mechanism of this invention with the reference viewing line of FIG. 1 indicated as 1—1.

FIG. 3 is a left side view in elevation of the invention as viewed from line 3—3 of FIG. 2.

FIG. 4 is an enlarged view of the indexing drive mechanism partly in section as viewed from the right side of the loading mechanism.

FIG. 7 is a section view of the drive mechanism as viewed on line 7—7 of FIG. 6.

FIG. 8 is a section view of the loading mechanism taken on line 8—8 of FIG. 3.

FIG. 9 is also a section of the mechanism on line 9—9 of FIG. 3.

FIG. 10 is a partial section view of FIG. 1 taken on line 10—10.

FIG. 11 is an enlarged side view of a work gripper mechanism.

FIG. 12 is a top elevation of the gripper of FIG. 11 from line 12—12.

FIG. 13 is a right side elevation of a bracket mechanism adapted for inclusion in the loading mechanism of this invention.

FIG. 14 is a left side elevation from line 14—14 of FIG. 2 of a jump-on in-process gauge adapted for inclusion in the mechanism of this invention.

Figure 1:
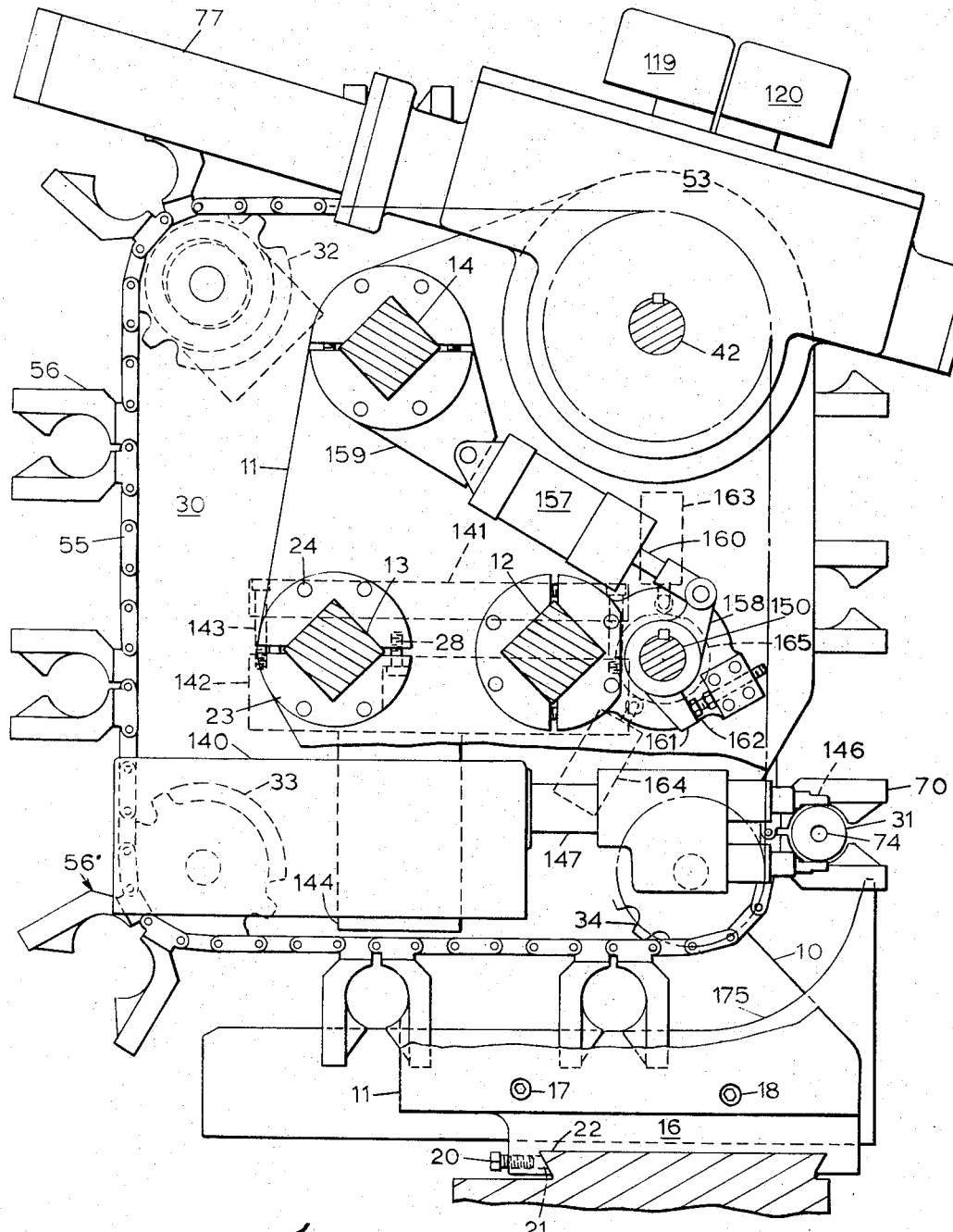
FIG. 1 is a right side view in elevation of the mechanism of this invention.

The mechanism of this loading fixture is supported in a frame that includes a pair of end support members 10, 11, FIG. 2, which are connected together for structural rigidity by a set of elongated members or connecting rods 12, 13, 14. Each of the end support members 10, 11 has a bracket 15, 16, respectively, fixed thereto by machine screws 17, 18 as shown in FIG. 1. Each of the brackets 15, 16 has a pair of clamping screws 19, 20 therein and these screws are adapted for turning into the brackets 15, 16 to shift a soft plug 21 firmly against the side of a dovetail way 22 extending along the machine to which the fixture is attached. This firmly connects the end support members 10, 11 to the machine way 22. The machine way 22 can be, for example, the table on a standard universal, center-type, grinding machine many forms of which are available and well known in the metal-working machinery art. The connecting rods 12, 13, 14 extend through the support members 10, 11 and are releasably connectable thereto. As shown in FIG. 2, the rods 12, 13, 14 extend considerably beyond the end member 11. This is to permit a change in the spacing between the end support members 10, 11 should such a change be desirable or necessary due to a change in the longitudinal dimension of workpieces to be handled by the fixture. The workpieces and manner of their handling are to be described subsequently herein. Each of the end support members 10, 11 has three spaced openings therethrough in which a split bushing such as the bushing 23 shown in FIG. 1 is received. The two portions of the bushing 23 are fixed to the end member 11 by screws 24. The interior surfaces of the bushing 23 are shaped to fit closely on the rod 13 and a pair of screws such as the screw 28 extend from one portion and into threaded engagement with the other portion of the bushing 23. By turning the screws 28 into the bushing 23, the two halves of the bushing 23 are flexed and pulled together to securely grip the rod 13. The rods 12, 13, 14 are each received in the same manner at both ends in the end members 10, 11. The rods 12, 13, 14 are not normally released from the end support 10, the movement of the other end support 11 along the rods being the manner by which spacing adjustment of the support members 10, 11 is made.

The connecting rods 12, 13, 14 support a pair of sprocket plates 29, 30 between the end support members 10, 11 and the mechanism by which workpieces 31, FIGS. 1, 2, are transported in the loading and unloading operation is supported from these sprocket plates. Each of the sprocket plates has a set of three chain sprockets, for example, the sprockets 32, 33, 34 which are supported directly therein in the same manner. The mounting of the sprocket 33 is shown clearly in FIG. 2. The sprocket 33 is attached to an axle member 35 by a pin 36 and the axle 35 is held in a pair of ball bearings 37, 38 that are received in the sprocket plate 30. A nut 39 is threaded onto the axle 35 to hold it in place in the bearings 37, 38. An additional sprocket is provided with each of the sets of sprockets such as the set of sprockets 32, 33, 34 described on the plate 30 and these are shown clearly in FIG. 8. These other sprockets 40, 41 are fixed in position adjacent to the plates 29, 30 respectively on a motor shaft 42 by set screws 43 (shown out of position in sprocket 40). Each of the sprockets 40, 41 can be released for adjustment along the shaft 42 by removal of the screws 43. The shaft 42 has a keyway 44 formed therealong and the sprockets 40, 41 each have a key 45, 46 fixed therein by pins 47, 48, respectively, to maintain the angular position of the sprockets 40, 41 on the shaft 42 and to provide a positive drive therebetween. The shaft 42 is supported in each of the sprocket plates 29, 30 in ball bearing journals 49, 50. One end of the shaft 42 is also held for rotation in a fixed axial position in the end member 10 by a nut 51 and a bearing 52. The shaft 42 extends through the other end member 11 where it is drivingly connected to a motor 53, to be described in detail later herein.

Each of the two sets of sprockets on the sprocket plates 29, 30 supports an endless chain 54, 55, respectively, and each chain is caused to be moved in step fashion in time with the other to successively move a series of the workpieces 31 to and from an operating position. The two endless chains 54, 55 are moved through identical paths which are parallel to one another and spaced in accordance with the spacing of the two sprocket plates 29, 30.

Each of the two chains has a set of work grippers such as the gripper 56, FIG. 1, and these are equispaced around the chains 54, 55 and are in alignment from chain to chain so that the workpieces 31 are carried parallel to the connecting rods 12, 13, 14 and the drive shaft 42, as shown in FIG. 2. The detail of the grippers 56 is best shown with reference to FIGS. 11, 12 wherein a single gripper is shown. The gripper is comprised of two jaws 57, 58 of similar construction which are attached by means of screws 59 and brackets 60 to adjacent chain links 61, 62. As shown, the jaw 57 includes a fork member 63 having two tines 64, 65 through the outer ends of which a pin 66 is received. The pin 66 also passes through a member 67 which is positioned between the tines 64, 65. The member 67 has a projection 68 extending toward the other jaw 58 and with the fork 63 defines an arcuate gripping or holding surface. The two opposing jaws 57, 58 define a generally circular area in which an end of the workpieces 31 will be confined. The member 67 is pivotally received over the pin 66 and a spring 69 is provided to tend to hold the member 67 in the position shown with the chainward end thereof seated firmly against the fork member 63. This construction allows a workpiece to be forcibly inserted into the jaws 57, 58 without their opening apart. Since the jaws 57, 58 of each gripper 56 are on different links of the chains 54, 55, the jaws will extend outward from the chain in a parallel manner as shown in FIG. 11 while the links 61, 62 are in a straight line but when the links are disposed around one of the sprockets, such as the sprocket 33, FIG. 1, the jaws 57, 58 will be angularly divergent to separate the projections 68 and allow a workpiece 31 to pass freely into or out from the space between jaws as for example, the jaws of the gripper 56' in FIG. 1.

The gripper assemblies 56 are equispaced around the chains 54, 55 and the motor mechanism 53 operates to rotate the shaft 42 through an angular disance such that the two sprockets 40, 41 drive the chains 54, 55 through a linear distance equal to the spacing between adjacent work grippers 56. The chains are driven in a clockwise direction as viewed in FIG. 1 and each of the grippers will stop in a position 70 which is the operating position or work station in the apparatus described. The workpiece 31 in the grippers at position 70 is lined up generally between a work holding mechanism such as the two centers 71, 72 which are indicated in FIG. 2 and can be conventional centers of the type used in precision grinding machines. The centers 71, 72 are adapted for movement together to engage the ends of the workpiece 31 in center holes 73, 74 whereby the workpiece 31 is supported on an accurate line between the centers 71, 72. It should be pointed out that the grippers 56 only loosely hold the workpieces 31 so that when they are held by the centers 71, 72, they are held clear of direct contact with the jaws 57, 58. The loading mechanism then only approximately locates the workpieces 31 at the work station 70 with final exact positioning being accomplished by a cradle mechanism to be described later herein and by the centers 71, 72 in the conventional manner.

The indexing motor mechanism 53 is shown in detail in FIGS. 4–7. The motor assembly 53 includes a housing 75 that is secured to the side of the support member 11 by machine screws 76. The housing 75 supports a piston and cylinder motor 77 having a piston rod 78 that extends into the housing 75 where a rack 79 is attached to its end for reciprocating movement in the housing 75 in a direction perpendicular to the shaft 42. The rack 79 is in driving engagement with a gear 80 that is rotatably received over a bushing 81 which is supported for rotation in the housing 75 by bearings 82, 83. The bearings 82, 83 are secured in end members 84, 85, respectively, and the end members 84, 85 are in turn fixed in the housing 75. The bushing 81 is rendered rotatable with the shaft 42 by a key 86 fixed thereto by a pin 87 and extending into the keyway 44 that extends along the shaft 42.

In order that the shaft 42 be driven in one direction only by reciprocation of the rack 79 and gear 80, a one way drive clutch mechanism is provided between the gear 80 and the bushing 81. This clutch includes a ring 88 attached to an end face of the gear 80 by screws 89. The bushing 81 has notches 90 milled into an end face and a set of pawls 91 are pivotally attached therein by pins 92. Bias springs 93 are provided to urge the pawls outward against the ring 88 which has a set of notched seats in which the outer ends of the pawls 91 fit. It can be seen in FIG. 7 that as the ring 88 is rotated clockwise with the gear 80, the bushing 81 will be driven clockwise with it but when the ring is rotated in the counter-clockwise direction, the pawls 91 will be cammed inward against the springs 93 and the bushing 81 will not be positively driven with the ring 88.

The housing 75 also encloses a control mechanism by which the rotation of the bushing 81 and shaft 42 are accurately controlled. A pair of control plates 94, 95 are held on the bushing 81 by a nut 96 and a key 97 extends from the bushing 81 into each of the plates 94, 95 so that they all rotate in unison. The plate 94 has three equi-spaced lugs 98 extending outward from its periphery and the plate 95 has three similar lugs 99 equispaced therearound but slightly angularly offset from the lugs 98. As shown, the top lug 98 of the plate 94 extends loosely into a notched finger 100 which is secured to a swinging member 101 by a nut 102. The member 101 is received on a pin 103 for rotation therearound and the pin 103 is fixed in a boss 104 in the motor housing 75. The member 101 also includes an arm portion 105 extending outward in a direction perpenduicular to the finger 100 to a position wherein it bears against a pin 106 that is received for sliding movement through a boss 107 in the housing 75. The pin 106 at its end opposite to the arm 105 is received in a longitudinal cam slot 108 that is formed along the rack member 79 on the side opposite its toothed side. A bias spring 109 is connected between the member 101 and the housing 75 to produce a force tending to rotate the member 101 so that the arm 105 is held against the pin 106 which then is forced downward against the rack member 79 and into the slot 108. A second swinging member 110 similar to the member 101 is also provided in the housing 75 and this second member 110 is swingably received on a pin 111 that is fixed in a boss 112. An arm 113 extends outward from the top and side of the member 110 to a position at which it engages a pin 114 that is slidably movable through another boss 115 in the housing 75. The pin 114 is in line with the slot 108 but with the rack 79 in the position shown, the pin 114 is engaged outside of the slot 108 and is in a position raised from the position of the pin 106 as viewed in FIG. 4. A spring 116 is also provided and connected between the swinging member 110 and the housing 75 to hold the arm 113 against the pin 114 and to urge the pin 114 toward the rack member 79. A finger 117 is attached to the swinging member 110 by a nut 118 and it extends along side of the finger 110 and over the plate 95 on which the lugs 99 are formed. The finger 117 is raised above the lugs 99 since the pin 114 is resting against the rack 79 out of the slot 108 whereby the pin 114 lifts the arm 113 and swings the member 110 against the bias of the spring 116.

The index mechanism described is operated periodically to rotate the drive shaft 42 clockwise, as viewed in FIGS. 1, 4, 7, sufficiently to move the chains 54, 55 a linear distance corresponding to the spacing between adjacent work grippers 56. Since the workpieces 31 are normally loaded on the mechanism at the rear and top sprocket 32 and off-loaded at the rear and lower sprocket 33, viewed as in FIG. 1, the weight of workpieces in the grippers 56 above the sprocket 34 tends to cause the chains to be driven clockwise also. It is therefore the function of the plates 94, 95 and the swinging members 101, 110 to control the movement of the chains so that they are limited to linear movement between adjacent grippers 56 for each reciprocal stroke of the motor 77.

Figure 5:
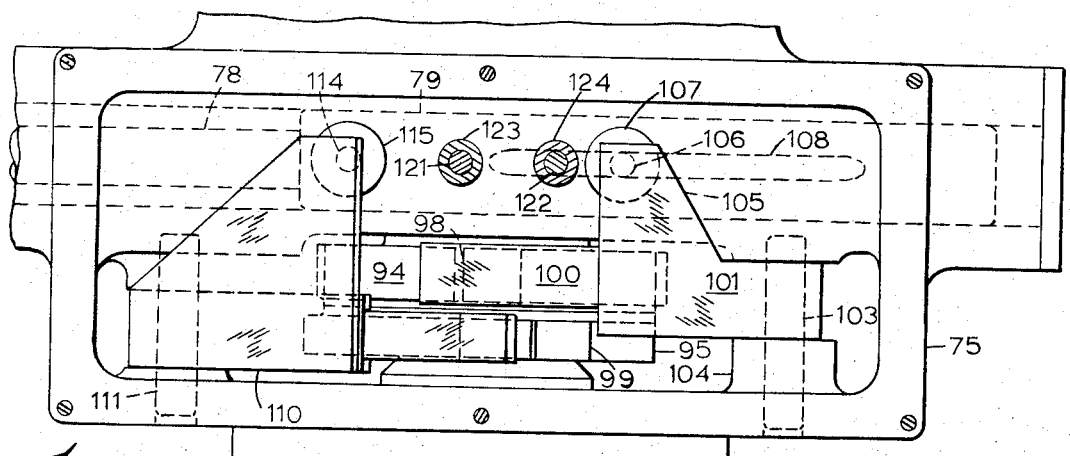
FIG. 5 is a section view of the drive mechanism of FIG. 4 on line 5—5.
Figure 6:
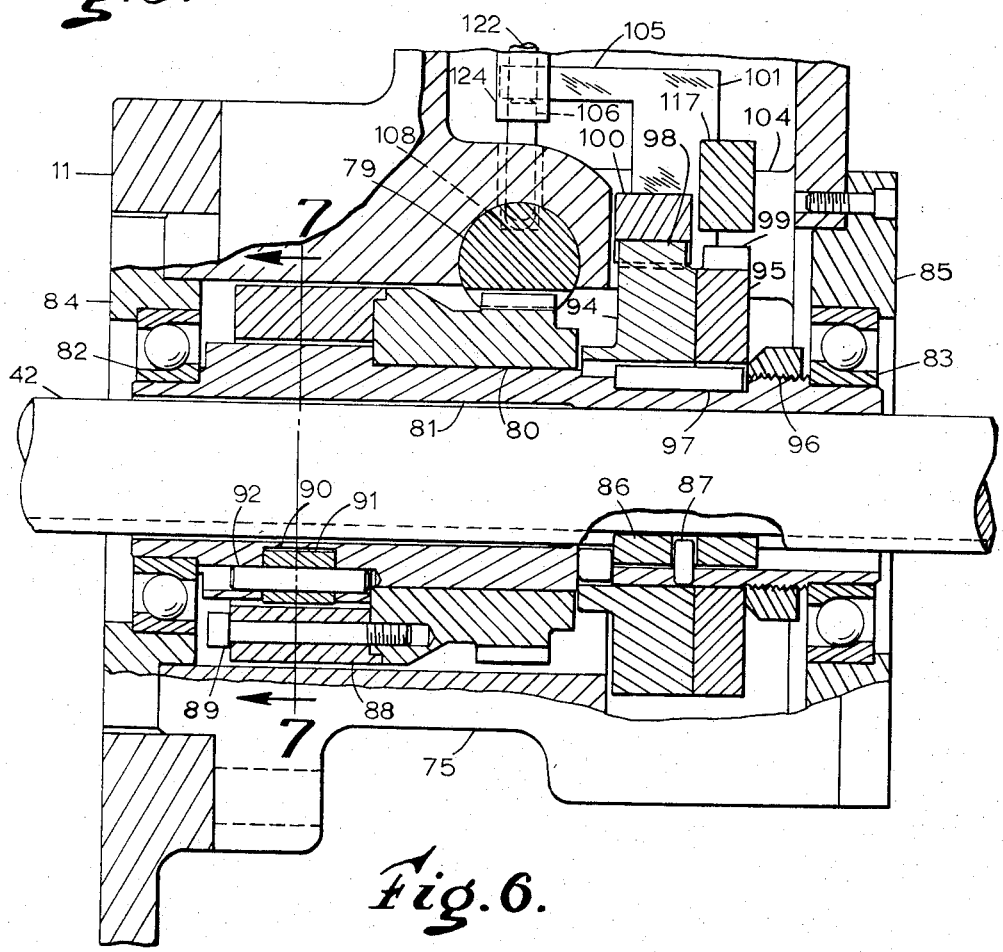
FIG. 6 is also a section view of the drive mechanism of FIG. 4 on line 6—6.

The motor 77 and the piston rod 78 are shown in FIGS. 4 and 5 in the rest position at the end of a power stroke. Upon the operation of the motor 77 to produce an index movement, the piston rod 78, and with it the rack 79, is moved leftward in an idle stroke that cocks the mechanism for powering the index movement of the chains 54, 55. During this movement, the slot 108 is carried to the pin 114 which drops down to allow the member 110 to swing clockwise and the finger 117 is moved toward the plate 95 behind the uppermost lug 99. Near the end of the idle stroke, the slot 108 is carried away from the pin 106 which is cammed upward to swing the member 101 clockwise to lift the finger 100 away from the plate 94. At the same time, the gear 80 is rotating counter-clockwise and carrying the clutch ring 88 with it. The pawls 91 in the one way clutch are cammed in against the springs 93 and the ring 88 is moved so that the notches therein are moved counter-clockwise toward the next adjacent pawl 91 from the respective positions shown.

When the motor 77 has retracted the piston rod fully, the motor 77 is reversed and causes the rack 79 to be moved back toward the right as viewed in FIG. 4. Soon after the start of this movement, the slot 108 is brought to the pin 106 and the member 101 is swung counterclockwise so that the finger 100 is moved back against the plate 94. The plate 94 is rotated clockwise with the shaft 42 from the position shown by means of the positive drive of the clutch mechanism. Therefore the finger drops onto the plate behind the lug 98 and ahead of the next lug 98'. Near the end of the movement of the rack 79 rightward to the position shown, the slot 108 is moved from the pin 114 which is then cammed upward to swing the finger 117 away from the plate 95 to allow the next lug 99' to pass by it. The finger 100 is chamfered so that the lug 98' will cam it upward until moved into the notch in the finger 100 at which time the finger 100 will be snapped down over the lug 98' to stop movement of the shaft 42. Pressure is maintained in the motor 77 which stalls and holds the mechanism firm in a position determined by the lug 98' and the notched finger 100.

The purpose of the finger 117 is to prevent the mechanism from running ahead more than one index space due to the weight of workpieces 31 carried in the mechanism. The finger 117 is moved against the plate 95 before the finger 100 is lifted away from the other plate 94. Therefore the shaft 42 can only be rotated until the lug 99' is moved to a position where it catches on the finger 117. This occurs before the grippers 56 have advanced one full space. The finger 100 is moved back against the plate 94 before the finger 117 is moved away from the plate 95 to insure that only a one-space movement is possible. The final index drive to the system in each index operation will always be through the clutch mechanism from the motor 77 since the finger 100 has a rather steep chamfer which requires the power from the motor 77 for causing the finger 100 to be cammed over the lugs 98. Therefore, the index motor 77 and the clutch mechanism will always catch up with the system before final index movement whether or not the chains 54, 55 move ahead of the drive during index movement.

The index mechanism also includes a pair of limit switch devices 119, 120 mounted on the housing 75. Each of these is operated by a plunger 121, 122, respectively, which slide through guides 123, 124 in the housing 75. The plungers 121, 122 each engage the rack 79 in line with the slot 108 so that they are moved up and down in response to movement of the rack. The switch 119 produces a signal near the end of an index movement to condition other mechanisms such as feed systems moving other mechanisms (not shown) for operation. The switch 120 produces a signal at the end of the retraction or idle stroke of the rack 79 to cause reversal of operation of the motor 77 during the index cycle.

It has been stated that the grippers 56 open to release the workpieces for free movement in and out therefrom as the respective grippers are moved around one of the sprockets due to the angular relation of the chain links. It has also been pointed out that workpieces are loaded onto the mechanism at the sprocket 32 and off-loaded at the sprocket 33. The workpieces will remain in the grippers 56 as they pass around the drive sprockets 41, 43 with the aid of gravity and the shape of the gripper jaws 58 (FIG. 11). However, the workpieces tend to fall from the grippers as they pass around the sprocket 34 due to their release and the effect of gravity. Therefore a pair of retaining rails 174, 175 (FIGS. 1 and 2) are provided having a curved guide surface extending around the path through which the workpieces 31 are carried as they move around the sprocket 34. The rails 174, 175 prevent the workpieces 31 from leaving the jaws 56 as they are opened around the sprocket 34. As shown in FIG. 2, the rail 174 is fixed to a small bracket 176 that extends from the mounting bracket 15 by which the support member 10 is secured to the table ways 22. The other rail 175 is attached to a mounting member 177 that is clamped directly to the ways 22 at a selected location between the end support members 10, 11 which is determined by the shape of the parts and the area thereof on which work is to be performed. These rails will be designed in accordance with the particular work part to be handled as will the work grippers 56.

The loading mechanism is also equipped with a mechanism to control the axial positioning of a workpiece 31 at the workstation. This mechanism is shown in FIGS. 3 and 10. A bracket 125 is attached to the end support member 10 and a yoke 126 is swingably connected thereto by an axle 127. The yoke 126 is adapted to engage diametrically opposed points on the side of a wide flange 128 extending around one end of the specific workpiece 31 shown. The yoke 126 has a bell end lever portion 129 which is embraced between two collars 130, 131 that are fixed on the end of a plunger 132. The plunger 132 is received in a supporting cylinder 133 attached to the side of the supporting member 10 opposite the side to which the bracket 125 is attached. The plunger 132 extends from the rear of the cylinder 133 where a flanged member 134 is connected, the purpose of which is to operate a limit switch 135 mounted on the sprocket plate 29 and having an arm extending into the path of travel of the flange 134, see also FIG. 2. The limit switch 135 is attached to an elongated bracket along the side of the plate 29 to allow for adjusting its position therealong when a change in setup is required for workpieces of a different shape.

The axial positioning of the workpiece 31 is performed in a conventional cycle after a new workpiece is presented to the workstation by the loading mechanism. The centers 71, 72 which are initially in a retracted position are advanced together to pick up the workpiece 31 in the workstation. The center 72, FIG. 2, moves at a faster rate so that the workpiece 31 is shifted leftward as viewed in FIG. 10 to the position shown. The center 71 continues to move rightward and the center 72 yields before it so that the workpiece 31 is shifted at a controlled rate toward the position indicated by reference number 136. The plunger 132 is biased to move back into the cylinder 133 so that the fork 126 follows along with the workpiece 131. When the workpiece reaches position 136, the limit switch 135 is actuated and the movement of the center 71 is stopped and a work cycle is begun.

As shown in FIG. 10, the flange 128 of the workpiece 31 in the position 136 is centered between two guide rails 137, 138 which extend around the loading mechanism adjacent to the end support member 10. As shown in FIGS. 2 and 3, the rails 137, 138 are supported from brackets 139 that are secured to the side of the end support member 10. The workpieces 31 are placed in the mechanism so that the flange 128 is embraced between the rails 137, 138 and the workpieces are confined in a rough range of axial positions for presentment to the centers 71, 72. As shown in FIG. 3, the rail 137 is discontinuous at the workstation location so that the workpiece 31 can be shifted leftward, as viewed in FIG. 10, to the position there shown during the final exact axial positioning cycle described.

The mechanism is also adapted to include an in-process gauge mechanism to measure the size of a portion of the workpiece during an operation such as finish grinding. The gauge mechanism and supporting structure is shown in FIGS. 1, 2 and 14. The gauge unit 140 is supported directly from the lower two connecting rods 12, 13. A clamping device formed of two bars 141, 142, adapted to fit onto the rods 12, 13, and screws 143 which draw the bars 141, 142 forcefully together supports the gauge unit 140 in position. A bracket 144 is attached to the lower bar 142 by screws 145 and the gauge unit 140 is supported on the bracket 143. The gauge unit 140 includes a pair of calipers 146 attached on a piston rod 147 that is adapted for movement into and out from the unit 140. This is a standard "jump-on" type of gauge unit which is first retracted during a change of workpieces at the workstation and then advanced to place the calipers 145 over a workpiece during an operation cycle. Gauges of this type are well known in the machine tool art and further detail herein is unnecessary.

As revealed in FIG. 14, the loader also includes a cradle mechanism to which reference has been made previously and which is operable to pick up the workpieces 31 and to support them in exact alignment with the centers 71, 72 for pick up by them at the end of an index cycle of the motor unit 53. This mechanism is comprised of a pair of spaced cradles 148, 149, see also FIGS. 2 and 9. The cradle 149 is shown in FIG. 14 out of position for clarity only since it is not located for viewing on the reference plane line 14—14 of FIG. 2. The cradle members 148, 149 are both clamped onto a rod 150 which is rotatably supported, as illustrated in FIG. 9, by bearings 151, 152 in the end member 10 and sprocket plate 29, respectively. Similar rotating support of the rod 150 is provided in the plate 30 and end member 11. As shown in FIG. 9, a key 153 is held in the cradle member 148 by a pin 154 and the key extends into a key slot 155 extending along the rod 150. The cradle 149 is similarly attached to the rod 150 and therefore the cradles will maintain a fixed angular relationship with the rod 150. The rod 150 in turn is angularly movable in the mechanism to alternately place the cradles 148, 149 in one or the other of the two positions indicated in FIG. 14 where the cradle 149 is shown in the extended position holding the workpiece 31 in position for engagement by the centers 71, 72 and wherein the retracted position is indicated by the phantom showing referenced 156. The motor powering the angular movement of the rod 150 is shown in FIG. 1. It includes a piston and cylinder motor 157 connected to a crank member 158 fixed onto the rod for rotation therewith. The motor 157 is swingably connected to the end support member 11 on a lug 159 near the rod 14. As shown, the motor 157 is operated so that its piston rod 160 has swung the crank 158 counter-clockwise until a dog 161 thereon is engaged firmly against a fixed stop 162. This holds the cradles 148, 149 in the extended position wherein the workpiece 31 at the workstation is exactly aligned between the centers 71, 72. Extension of the rod 160 from the motor 157 will swing the rod 150 to move the cradles 148, 149 to their retracted positions 156. This will occur in a normal cycle after axial positioning of a workpiece and just prior to an operation cycle by the other machine mechanism. There is provided a pair of limit switches 163, 164 attached to the sprocket plate 30 and which are engaged by a cam 165 fixed to rotate with the shaft 150. The cam 165 is shaped such that the limit switches 163, 164 will provide signals when the cradles 148, 149 are retracted and advanced, respectively, these signals being used in controlling machine cycles by means of conventional relay circuitry, not shown.

The loading mechanism is optionally provided with a backrest mechanism shown in FIG. 13. The backrest mechanism is also supported from the rods 12, 13 at a location between the end member 11 and the sprocket plate 29. A slide bar 166 is clamped onto the bars 12, 13 by screws 167 in a selected position therealong. Slide V-ways 168 are formed along the bar 166 and a slider member 169 is received thereon for movement out and back to engage with and withdraw from, respectively, a workpiece 31 supported between the centers 71, 72 at the workstation. The slider member 169 is moved by a piston and cylinder motor 170 attached to the bar 166 and connected to the slider 169 by a piston rod 171. The slider 169 carries a pair of adjustable shoes 172, 173 which are adapted to engage behind and below the workpiece 31 at the workstation to strengthen the workpiece 31 against deflection due to operation forces such as the pressure resulting from a precision grinding operation.

From the foregoing detailed description, it can be seen that the loading mechanism of this invention is operable with a minimum of mechanism to coordinate the step-by-step movement and the gripping and release of workpieces. It can also be seen that the mechanism is easily convertible with a minimum of tooling alteration for the handling of different workpieces having great differences in dimensions. Consequently a reduced inventory of unique parts is required to maintain the equipment in readiness for application in a variety of production jobs.

What is claimed is:

1. An automatic loading mechanism for presenting elongated workpieces to a workstation in a machine comprising:
   (a) a pair of spaced end support members adapted for attachment to the machine in a selected position,
   (b) a plurality of elongated connecting members extending parallelly from one of said end support members and through the other end support member,
      (1) said other end support member releasably connectable to said connecting members,
   (c) a pair of sprocket plates supported on said connecting members between said end plates and spaced from another,
      (1) one of said sprocket plates adjustably positionable along said connecting members,
   (d) a set of chain sprockets rotatably attached to each of said sprocket plates,
   (e) a chain received over each of said sets of sprockets,
      (1) each of said chains having a plurality of links pivotally secured seriatim in a closed loop,
   (f) a plurality of work grippers equi-spaced around each of said chains,
      (1) each of said work grippers having a pair of jaws adapted for confining an end of a workpiece therebetween when parallel to one another and opening to release the end of the workpiece when divergent by a predetermined angular distance,
      (2) the jaws of each gripper being attached to different links on the respective chain and being parallel when the respective links to which said jaws are attached are in a straight line and being divergent by said predetermined angular distance when the respective links are angularly disposed around one of said sprockets,
   (g) means for angularly indexing one of the sprockets of each sprocket plate simultaneously through equal angles corresponding to linear movement of said chains an amount equal to the spacing of said grippers thereon,
   (h) an in-process gauge unit, and
   (i) means for releasably attaching said gauge unit to said connecting members in a position between said sprocket plates and inside the loops of said chains at a location to measure a workpiece at the workstation.

2. An automatic loading mechanism for presenting elongated workpieces to a workstation in a machine comprising:
   (a) a pair of spaced end support members adapted for attachment to the machine in a selected position,
   (b) a plurality of elongated connecting members extending parallelly from one end of said end support members and through the other end support member,
      (1) said other end support member releasably connectable to said support members,
   (c) a pair of sprocket plates supported on said connecting members between said end plates and spaced from one another,
      (1) one of said sprocket plates adjustable positionable along said connecting members,
   (d) a set of chain sprockets rotatably attached to each of said sprocket plates,
   (e) a chain received over each of said sets of sprockets,
      (1) each of said chains having a plurality of links pivotally secured seriatim in a closed loop,
   (f) a plurality of work grippers equi-spaced around each of said chains,
      (1) each of said work grippers having a pair of jaws adapted for confining an end of a workpiece therebetween when parallel to one another and opening to release the end of the workpiece when divergent by a predetermined angular distance,
      (2) the jaws of each gripper being attached to different links on the respective chain and being parallel when the respective links to which said jaws are attached are in a straight line and being divergent by said predetermined angular distance when the respective links are angularly disposed around one of said sprockets,
   (g) means for angularly indexing one of the sprockets of each sprocket plate simultaneously through equal angles corresponding to linear movement of said chains an amount equal to the spacing of said grippers thereon,
   (h) a backrest mechanism adapted to engage a workpiece, and
   (i) means for releasably attaching said backrest mechanism to said connecting members in a position between said sprocket plates and inside the loops of said chains at a location to engage a workpiece at the workstation.

References Cited

UNITED STATES PATENTS

| 836,684 | 11/1906 | Hird | 51—215.5 |
| 1,039,727 | 10/1912 | Gilmartin | 294—110 |
| 1,167,496 | 1/1916 | Harders | 198—179 X |
| 1,939,383 | 12/1933 | Bradley | 198—135 |
| 3,024,905 | 3/1962 | Casler | 209—88 X |

EDWARD A. SROKA, *Primary Examiner.*